(12) United States Patent
Breeze-Stringfellow et al.

(10) Patent No.: US 8,684,698 B2
(45) Date of Patent: Apr. 1, 2014

(54) COMPRESSOR AIRFOIL WITH TIP DIHEDRAL

(75) Inventors: Andrew Breeze-Stringfellow, Cincinnati, OH (US); David Scott Clark, Liberty Township, OH (US); Brent F. Beacher, Liberty Township, OH (US)

(73) Assignee: General Electric Company, Schenectady, NY (US)

( * ) Notice: Subject to any disclaimer, the term of this patent is extended or adjusted under 35 U.S.C. 154(b) by 442 days.

(21) Appl. No.: 13/071,996

(22) Filed: Mar. 25, 2011

(65) Prior Publication Data

US 2012/0243975 A1 Sep. 27, 2012

(51) Int. Cl.
 *F01D 5/12* (2006.01)

(52) U.S. Cl.
 USPC .................. 416/243; 416/223 A; 416/DIG. 2; 416/DIG. 5

(58) Field of Classification Search
 USPC ............ 416/223 R, 223 A, 238, 243, DIG. 2, 416/DIG. 5
 See application file for complete search history.

(56) References Cited

U.S. PATENT DOCUMENTS

| | | | |
|---|---|---|---|
| 3,467,197 A | 9/1969 | Spivey | |
| 5,064,345 A | 11/1991 | Kimball | |
| 5,167,489 A | 12/1992 | Wadia et al. | |
| 6,299,412 B1 | 10/2001 | Wood et al. | |
| 6,312,219 B1 | 11/2001 | Wood et al. | |
| 6,508,630 B2 | 1/2003 | Liu et al. | |
| 6,899,526 B2 | 5/2005 | Doloresco et al. | |
| 7,726,937 B2 | 6/2010 | Baumann et al. | |
| 8,128,376 B2 | 3/2012 | Karem | |
| 8,133,012 B2 | 3/2012 | Nagai et al. | |
| 8,147,207 B2 | 4/2012 | Orosa et al. | |
| 8,167,567 B2 | 5/2012 | Kirchner et al. | |
| 2005/0031454 A1 | 2/2005 | Doloresco et al. | |
| 2007/0297904 A1 | 12/2007 | Hoeger | |
| 2008/0131271 A1 | 6/2008 | Wood et al. | |
| 2008/0131272 A1 | 6/2008 | Wood et al. | |

(Continued)

FOREIGN PATENT DOCUMENTS

| EP | 1074700 A2 | 2/2001 |
|---|---|---|
| EP | 1505302 A1 | 2/2005 |
| EP | 1930598 A2 | 6/2008 |
| EP | 2199543 A2 | 6/2010 |

OTHER PUBLICATIONS

Gallimore, Simon J., et al., The Use of Sweep and Dihedral in Multistage Axial Flow Compressor Blading—Part II: Low and High-Speed Designs and Test Verification, Journal of Turbomachinery, Oct. 2002, vol. 124.

(Continued)

*Primary Examiner* — Edward Look
*Assistant Examiner* — Juan G Flores
(74) *Attorney, Agent, or Firm* — Global Patent Operation; Vivek P. Shankam

(57) ABSTRACT

An airfoil for a compressor is described. The airfoil has a root, an airfoil tip, a leading edge, a trailing edge, airfoil pressure and suction sides extending between the leading edge and the trailing edge. The airfoil has an inner span region and an outer span region and the trailing edge has a dihedral profile such that the trailing edge dihedral angle decreases in at least a portion of the inner span region and the outer span region.

18 Claims, 8 Drawing Sheets

(56) References Cited

U.S. PATENT DOCUMENTS

| | | |
|---|---|---|
| 2008/0148564 A1 | 6/2008 | Burton et al. |
| 2008/0152505 A1 | 6/2008 | Burton et al. |
| 2008/0181769 A1 | 7/2008 | Wilson et al. |
| 2010/0054946 A1 | 3/2010 | Orosa et al. |
| 2010/0150729 A1* | 6/2010 | Kirchner et al. .......... 416/223 R |
| 2010/0260609 A1 | 10/2010 | Wood et al. |

OTHER PUBLICATIONS

Previously designed airfoils incorporating sweep and dihedral to include General Electric GEnx Core 1, Row 9 airfoils implemented prior to Apr. 2005 and with reference to previously cited US Patent 6899526 to Doloresco et al. issued May 31, 2005.

Previously designed airfoils incorporating sweep and dihedral to include Joint Strike Fighter F136 Alternative Engine, Phase III, Row 5 airfoils implemented prior to Apr. 2005 and with reference to previously cited US Patent 6899526 to Doloresco et al. issued May 31, 2005.

U.S. Appl. No. 13/072,027, filed Mar. 25, 2001, Breeze-Stringfellow et al.

G. Scott McNulty et al., "The Impact of Forward Swept Rotors on Tip-Limited Low-Speed Axial Compressors", Proceedings of ASME/IGTI Turbo Expo, Jun. 16-19, 2003, Atlanta, GA.

Leroy H. Smith, Jr. et al., "Sweep and Dihedral Effects in Axial-Flow Turbomachinery", Transaction of the ASME, Sep. 1963.

Mingming, M. et al.: "Numerical Investigation of the Unsteady Flow in a Transonic Compressor with Curved Rotors", Chinese Journal of Aeronautics, vol. 21, No. 2, Apr. 1, 2008, pp. 97-104.

PCT Search Report and Written Opinion dated Jul. 20, 2012 from corresponding Application No. PCT/US2012/029365.

* cited by examiner

COMPRESSOR AIRFOIL WITH TIP DIHEDRAL

BACKGROUND OF THE INVENTION

This invention relates generally to jet propulsion engines, and more specifically to compressor airfoils used therein.

In a gas turbine engine air is pressurized in a compressor and mixed with fuel in a combustor for generating hot combustion gases. The combustion gases are discharged through turbine stages which extract energy therefrom for powering the compressor, and producing output power for use in driving a booster (low pressure compressor) and a fan in an exemplary turbofan aircraft engine application.

A multistage axial compressor includes cooperating rows of stator vanes and rotor blades which decrease in size to pressurize air in stages. The compressor vanes and blades have corresponding airfoils which typically vary in configuration as their size decreases from stage to stage for maximizing performance of the compressor. Compressor performance includes, for example, efficiency of compression, flow capability, and stall margin, which are all affected by the configuration of the vanes and blades.

More specifically, the flow or pressure distribution of the air as it is being compressed through the stator vanes and rotor blades is a complex three dimensional flow field varying circumferentially around the compressor, radially along the span of the vane and blade airfoils, and axially along the circumferentially opposite pressure and suction sides of the airfoils.

The airfoil pressure side is a generally concave surface cooperating with the opposite suction side, which is a generally convex surface, for efficiently pressurizing the air as it flows between blades in the axial downstream direction between the leading and trailing edges thereof. The pressure distribution of the air undergoing compression varies from the radially inner root of the airfoil to the radially outer tip of the airfoil which is spaced closely adjacent to a surrounding compressor casing to provide a suitable radial gap or clearance therewith.

The airfoil, itself, may be supported from the compressor rotor in any suitable manner such as being formed integrally therewith in a unitary blisk configuration, or each rotor airfoil may have an integral platform and dovetail for mounting the compressor blade in a corresponding dovetail slot formed in the perimeter of the compressor rotor.

Axial and mixed flow compressor blades that are designed to compress the air usually have a rotor or number of rotors that rotate inside a stationary casing and act to raise the total pressure and temperature of the flow passing through the machine. The compressor rotor blades carry a lift on the body of the airfoil that manifests itself as a higher static pressure on the pressure surface of the airfoil and a lower static pressure on the suction surface of the airfoil. Generally a small gap exists between the tip of the compressor rotor and the radially adjacent casing flowpath. The pressure difference between pressure side and suction side of the airfoil drives flow through the tip gap of the compressor rotor. This tip flow can roll up into a vortex, which tends to collect on the pressure side surface of the circumferentially adjacent blade, leading to high levels of loss and blockage in the compressor tip region. As this blockage spreads across the compressor rotor tip, the ability of the compressor to produce a pressure rise decreases, and may result in a stall in some cases.

In the art, casing treatments, such as circumferential grooves have sometimes been used to control or reduce the tip leakage and improve stall margin, but with an associated efficiency penalty. While these methods serve to reduce tip leakage flow levels, they do not control losses and blockage created by the remaining tip flow.

Accordingly, it would be desirable to have a compressor rotor blade having an airfoil with specific features that can reduce the propagation of the flow blockage across the blade passage thereby facilitating improvement of the compressor stall margin.

BRIEF DESCRIPTION OF THE INVENTION

The above-mentioned need or needs may be met by exemplary embodiments disclosed herein which provide an airfoil for a compressor, the airfoil comprising a root, an airfoil tip, a leading edge, a trailing edge, airfoil pressure and suction sides extending between the leading edge and the trailing edge. The airfoil has an inner span region and an outer span region and the trailing edge has a dihedral profile such that the trailing edge dihedral angle decreases in at least a portion of the inner span region and the outer span region. In another embodiment of the present invention, the trailing edge has a forward sweep in the outer span region. In another embodiment of the present invention, the leading edge has a dihedral profile such that the leading edge dihedral angle increases in a first inner span region and decreases in a first outer span region. In another embodiment, the leading edge has a forward sweep in the first outer span region.

BRIEF DESCRIPTION OF THE DRAWINGS

The subject matter which is regarded as the invention is particularly pointed out and distinctly claimed in the concluding part of the specification. The invention, however, may be best understood by reference to the following description taken in conjunction with the accompanying drawing figures in which:

DETAILED DESCRIPTION OF THE INVENTION

Figure 1:
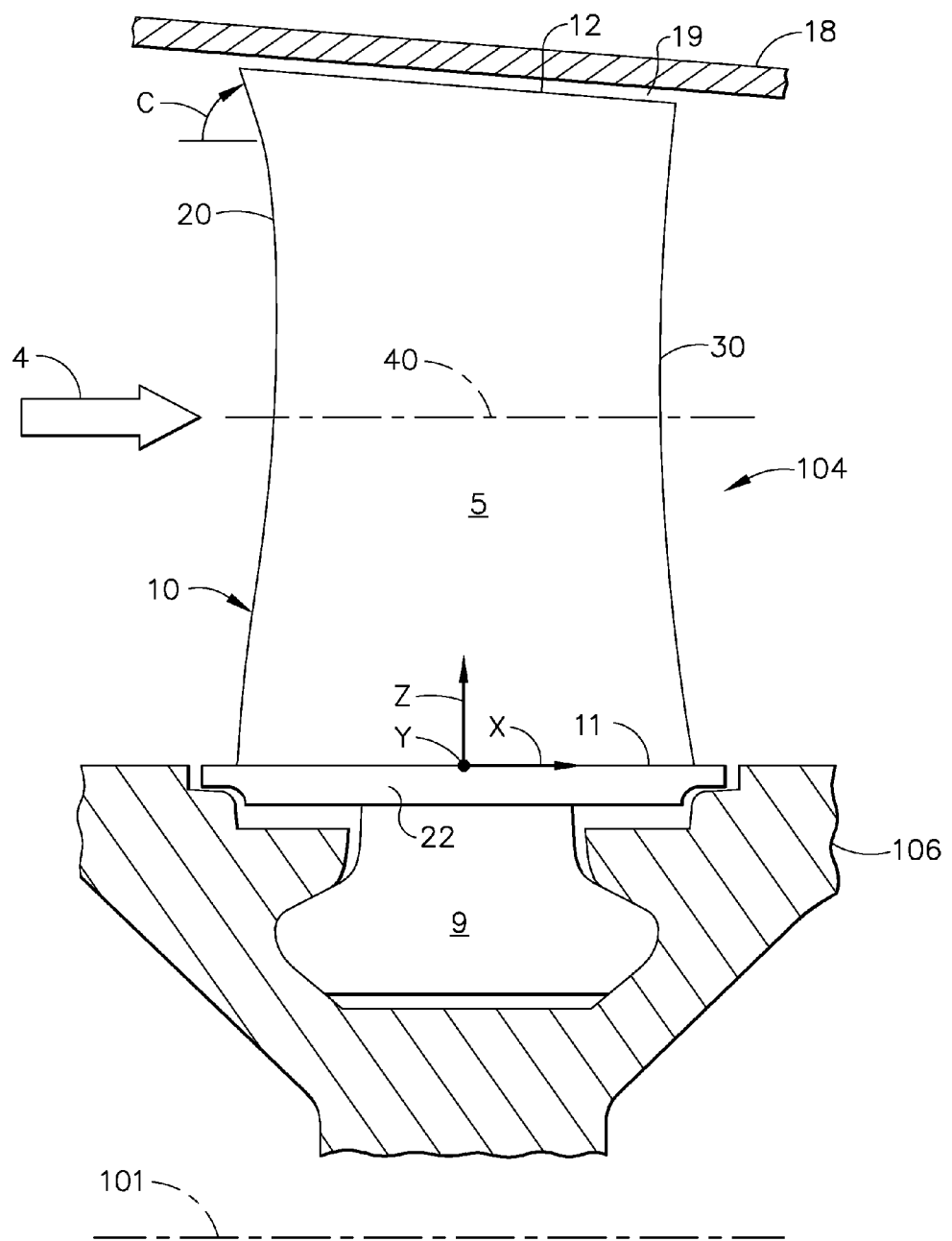
FIG. 1 is a partly sectional side view of a row of compressor rotor blades in a multistage axial compressor constructed according to an aspect of the present invention.
Figure 8:
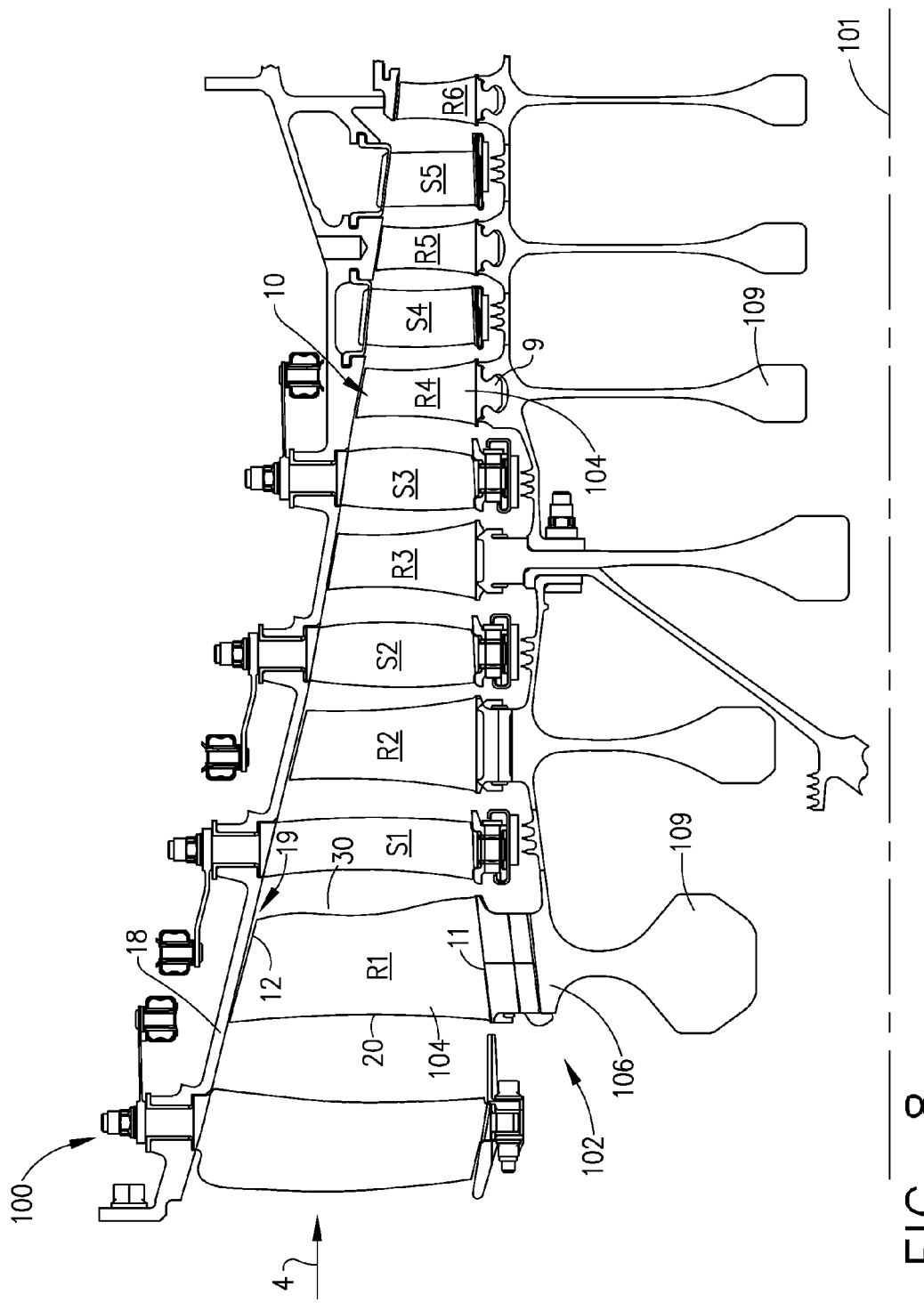
FIG. 8 is a schematic cross-sectional view of a multi-stage compressor having a row of compressor rotor airfoils according an exemplary embodiment of the present invention.

Referring to the drawings wherein identical reference numerals denote the same elements throughout the various views, FIG. 1 is a schematic cross-sectional view of a portion a partly sectional side view of a row of compressor rotor blades in a multistage axial compressor constructed according to an aspect of the present invention. FIG. 8 is a schematic cross-sectional view of a multi-stage compressor 100 having a row of compressor rotor blades 104 having airfoils 10 according to an exemplary embodiment of the present invention, as described herein below.

Illustrated and shown in part in FIG. 8 is a row of compressor rotor stages 102 comprising compressor blades 104 suitably mounted to a compressor rotor 106 of a multistage axial compressor 100 in a gas turbine engine. The compressor 100 has several stages of stator vanes (shown as S1, S2, etc.) cooperating with corresponding compressor rotor blades (shown as R1, R2, etc.) which decrease in size in the downstream (axial) direction as air 4 is compressed during operation. The rotor 106 is axisymmetrical around the axial centerline axis 101 of the engine and supports a full row of the blades 104 within an annular outer casing 18. A small gap 19 exists between the tip 12 of the compressor rotor blade 104 and the radially adjacent casing 18. The rotor 106 further comprises one of more disks 109 that support the blades.

Each compressor rotor blade 104 includes an airfoil 10 extending in along a radial axis Z (the direction referred to herein as "span", see FIG. 1) between the perimeter of the rotor and the inner surface of the casing 18. The airfoil may be integrally formed with the rotor 106 in a blisk configuration (not shown), or may be removably joined thereto in a conventional manner, such as for example, using a circumferential dovetail 9 shown in FIGS. 1, 2 and 8 or an axial dovetail 7 shown in FIGS. 3 and 8. Other known dovetail forms, such as an axially angled dovetail (not shown) configuration may alternatively be used to support the blade 104 in a rotor. Each blade 104 may include an integral platform 22 which defines the inner boundary for the air being compressed. In the exemplary embodiments shown in FIGS. 1 and 2, an integral dovetail 9 extends from the platform 22 in a unitary configuration with the blade 104 for being mounted in a complementary dovetail slot in the perimeter of the rotor 106. In the exemplary embodiment illustrated in FIGS. 1 and 2, the dovetail 9 is a circumferential entry dovetail for suitably mounting in the perimeter of the rotor 106.

Figure 2:
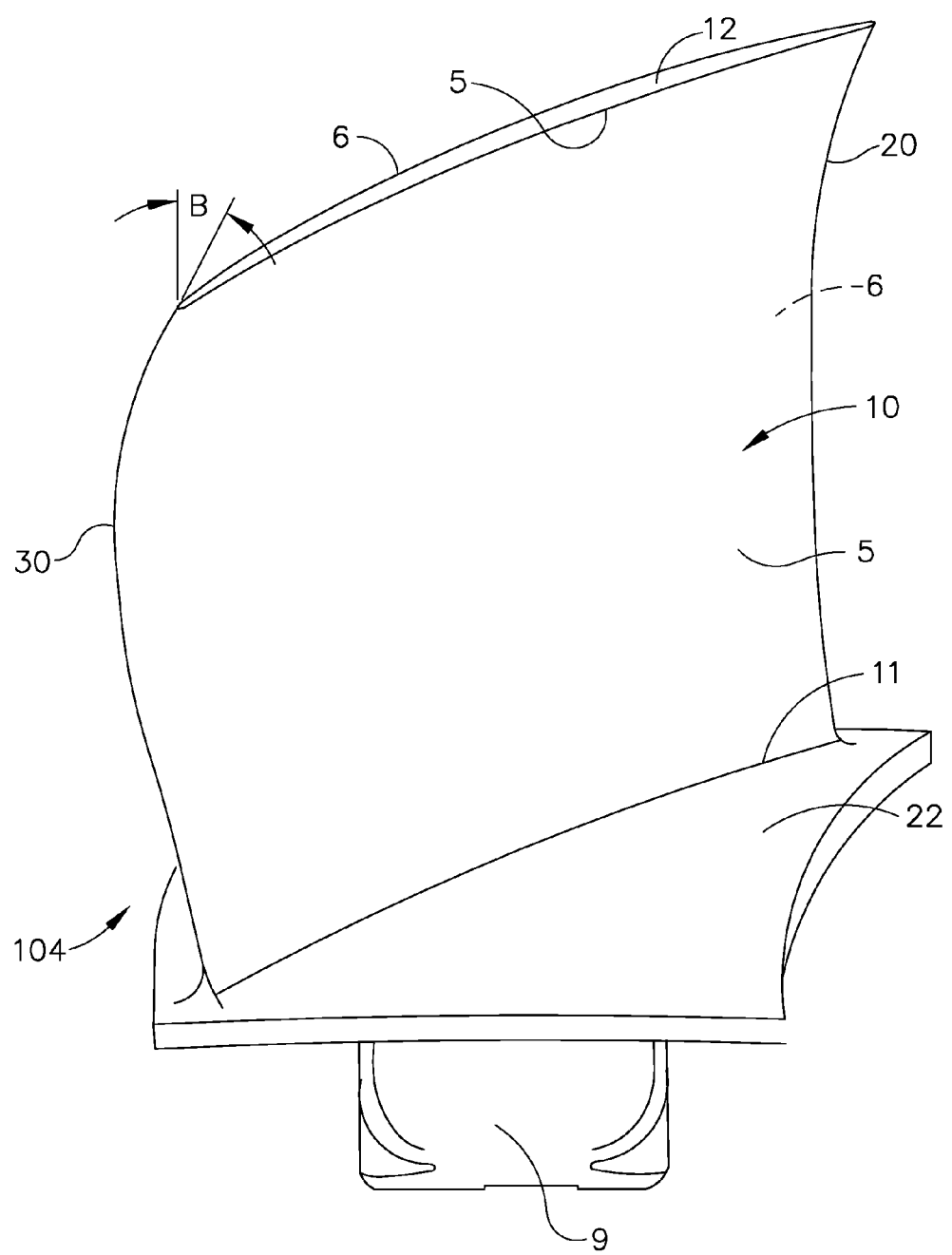
FIG. 2 is an isometric view of an exemplary one of the compressor rotor blades illustrated in FIG. 1 in isolation.

The compressor airfoil 10 is illustrated in a preferred embodiment in FIGS. 1 and 2 and includes circumferentially or laterally opposite pressure and suction sides 5, 6. The airfoil pressure side 5 is generally concave and precedes the generally convex suction side 6 as the airfoil rotates in the circumferential direction, represented by the Y axis (see FIG. 1), atop the rotor 106. The axial axis X is parallel with the compressor centerline axis 101 and represents the generally downstream direction of the air 4 as it undergoes compression through the multiple stages of the compressor 100 (see FIG. 8).

The corresponding surfaces of the pressure and suction sides 5, 6 are joined together at axially or chordally opposite leading and trailing edges 20, 30 and extend in the span direction (Z-axis in FIG. 1) from a radially inner root 11 at the junction with the platform to a radially outer tip 12 that is located at a spanwise distance from the root 11 as shown in FIG. 1. As shown in FIGS. 1 and 8, the airfoil tip 12 is disposed closely adjacent to the inner surface of the surrounding casing 18 and defines a radial clearance or gap 19 therebetween extending between the leading and trailing edges 20, 30 of the airfoil 10. The generally concave configuration of the airfoil pressure side 5, and the generally convex configuration of the airfoil suction side 6 are defined for pressurizing the air 4 as it flows downstream between the compressor rotor blades 104 in each stage of the compressor 100.

In one aspect of the present invention, as described in detail below, airfoil 10 has certain geometries having specific dihedral features for the leading and trailing edges 20, 30 and the resulting geometries near the air foil tip 12 serve to pull relatively weaker airflow out of the airfoil tip region towards radially inwards near the tip along the pressure side 5 surface of the airfoil 10. This weak flow then mixes with the main body of airflow 4, rather than building up in the airfoil tip region causing inefficiencies and potential stall. In another aspect of the present invention, certain specific sweep profiles are used for the leading and trailing edges 20, 30 in conjunction with specific dihedral features as described in detail below. The specific features of the airfoil described herein thereby facilitate improvement in the stall margin and extending the throttle range of the airfoil.

Some of the specific airfoil features as described in detail herein below contribute to the advantages of the present invention. For example, a dihedral profile at the leading edge 20 having a negative dihedral at tip 12 contributes to a radially concave airfoil shape on the blade pressure side 5 surface near tip, which produces a radial velocity component towards the engine centerline 101. This also discourages centrifuging of flow towards the blade tip 12 on the blade pressure side 5 surface. Similarly, a negative dihedral at the trailing edge 30 near the tip region, results in convection of weak flow out of the critical tip region. Further, a specific tip dihedral gradient at the leading and trailing edges 20, 30, causing a high slope of this geometric parameter, results in a curled blade shape near the trailing edge (see FIG. 3 for example), delaying the propagation of weak flow across the rotor passage between circumferentially adjacent airfoils. Further, a forward sweep in the tip region, as described herein, helps to reduce creation of undesirable tip vortex and reduces accumulation of boundary layer flow in the tip region.

Figure 3:
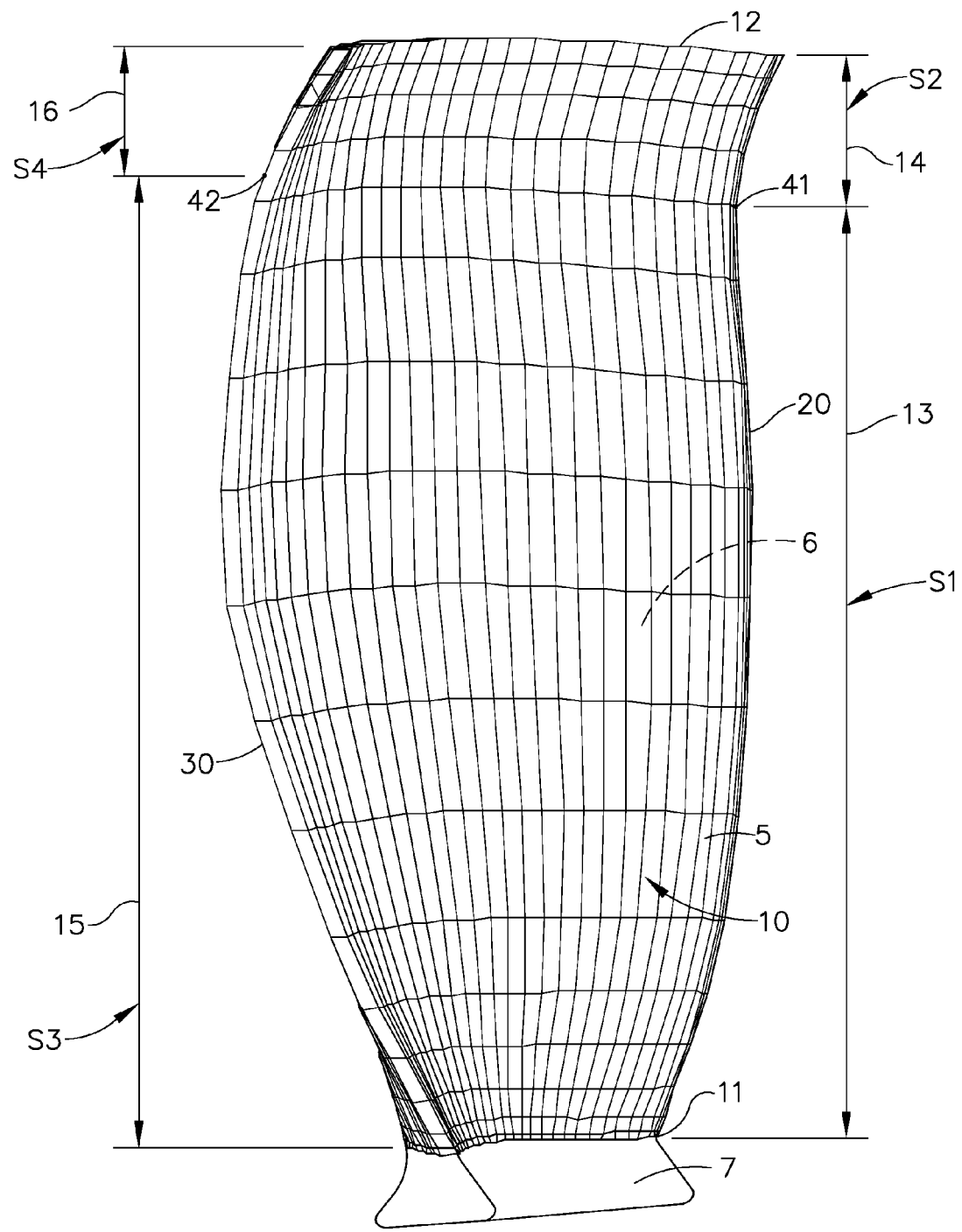
FIG. 3 is an isometric view of an exemplary compressor rotor blade according to an aspect of the present invention, with a superimposed grid for geometric illustration purposes.

FIGS. 1-3 show an airfoil 10 for a compressor according to one embodiment of the present invention. It has an airfoil root 11, an airfoil tip 12 located at a spanwise distance from the airfoil root 11, a leading edge 20 extending from the airfoil root 11 to the airfoil tip 12, a trailing edge 30 extending from the airfoil root 11 to the airfoil tip 12, airfoil pressure and suction sides 5, 6 extending between the leading edge 20 and the trailing edge 30. As shown in FIG. 3, the airfoil 10 leading edge 20 has a first inner span region 13 (shown as "S1") between the airfoil root 11 and a first height location 41 on the leading edge and a first outer span region 14 (shown as "S2") between the first height location 41 and the airfoil tip 12. As mentioned previously herein, the leading edge 20 has a specific dihedral profile such that the leading edge dihedral angle increases, in a spanwise direction, in the first inner span region 13 and decreases in the first outer span region, such as, for example, shown in FIG. 5. The terms "Dihedral" (or, alternatively, "dihedral angle") and "sweep" as used herein, are conventional terms used in the design of airfoils (see, for example, Leroy H. Smith, J R. et. al, "Sweep and Dihedral Effects in Axial-Flow Turbomachinery", Transaction of the ASME, September, 1963). A dihedral angle, as used herein, is shown as angle "B" in FIG. 2 for illustration purposes. The angle B, although shown at the trailing edge tip of the airfoil 10 for illustration purposes, may exist at other locations on the airfoil, such as for example shown in FIGS. 4 and 5 for the leading edge 20 and trailing edge 30.

Figure 5:
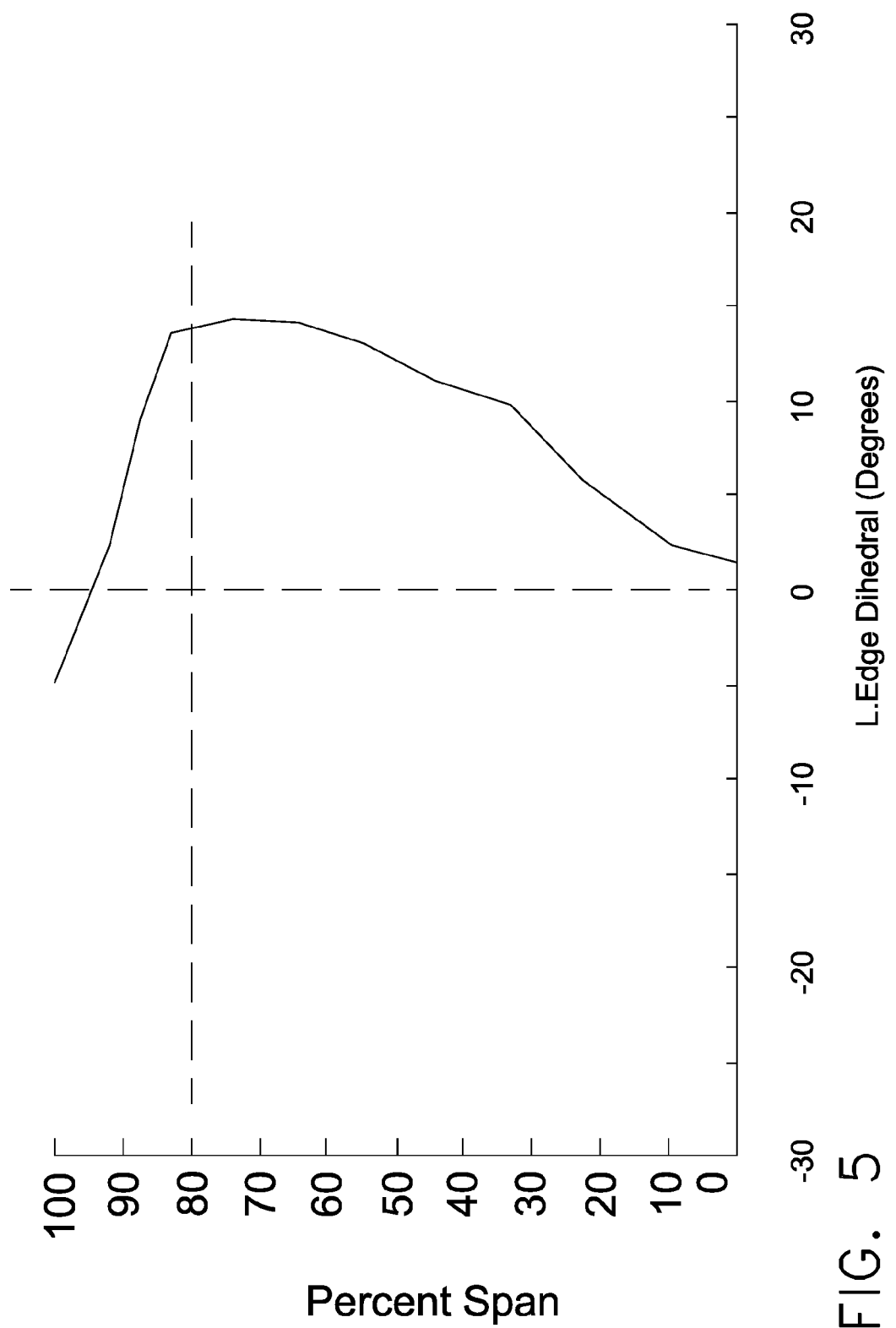
FIG. 5 is a graph plotting airfoil leading edge dihedral angle in degrees over the radial span of the airfoil of the blade illustrated in FIG. 3 in an exemplary embodiment.

FIG. 5 shows an exemplary airfoil leading edge 20 dihedral profile according to one embodiment of the present invention of an airfoil 10 shown in FIG. 3 for example. It should be noted that the leading edge dihedral angle at the airfoil tip 12 is negative. In the context, a negative dihedral is one that would have a spanwise concave shape for the pressure side 5 of the airfoil 10. A positive dihedral is one that would have a convex shape for the pressure side 5 of the airfoil 10. In one exemplary embodiment, the airfoil 10 has a leading edge dihedral angle profile (see FIG. 5) that decreases at a substantially constant rate of change with respect to the span. In a preferred exemplary embodiment, the first outer span region 14 extends from about 80% of the span to the airfoil tip 12. See FIG. 5. In another exemplary embodiment, in addition to the unique dihedral profile shown in FIG. 5, the airfoil 10 leading edge 20 has a forward sweep angle in the first outer span region. This is shown in FIG. 7. As used herein (see FIGS. 6 and 7) a forward sweep is denoted by a negative value for the sweep angle and an aft (or rearward) sweep is denoted by a positive value for the sweep angle. A sweep angle is shown as angle "C" in FIG. 1 for illustration purposes only. A sweep angle C, although shown at the trailing edge tip of the airfoil 10 for illustration purposes, may exist at other locations on the airfoil, such as for example shown in FIGS. 7 and 6 for the leading edge 20 and trailing edge 30. Aerodynamic sweep is a conventional parameter represented by a local sweep angle which is a function of the direction of the incoming air and the orientation of the airfoil surface in both the axial, and circumferential or tangential directions. The sweep angle is defined in detail in the U.S. Pat. No. 5,167,489, and is incorporated herein by reference. In the sign convention used herein, the aerodynamic sweep angle is represented as a negative value (−) for forward sweep, and a positive value (+) for aft sweep.

Figure 4:
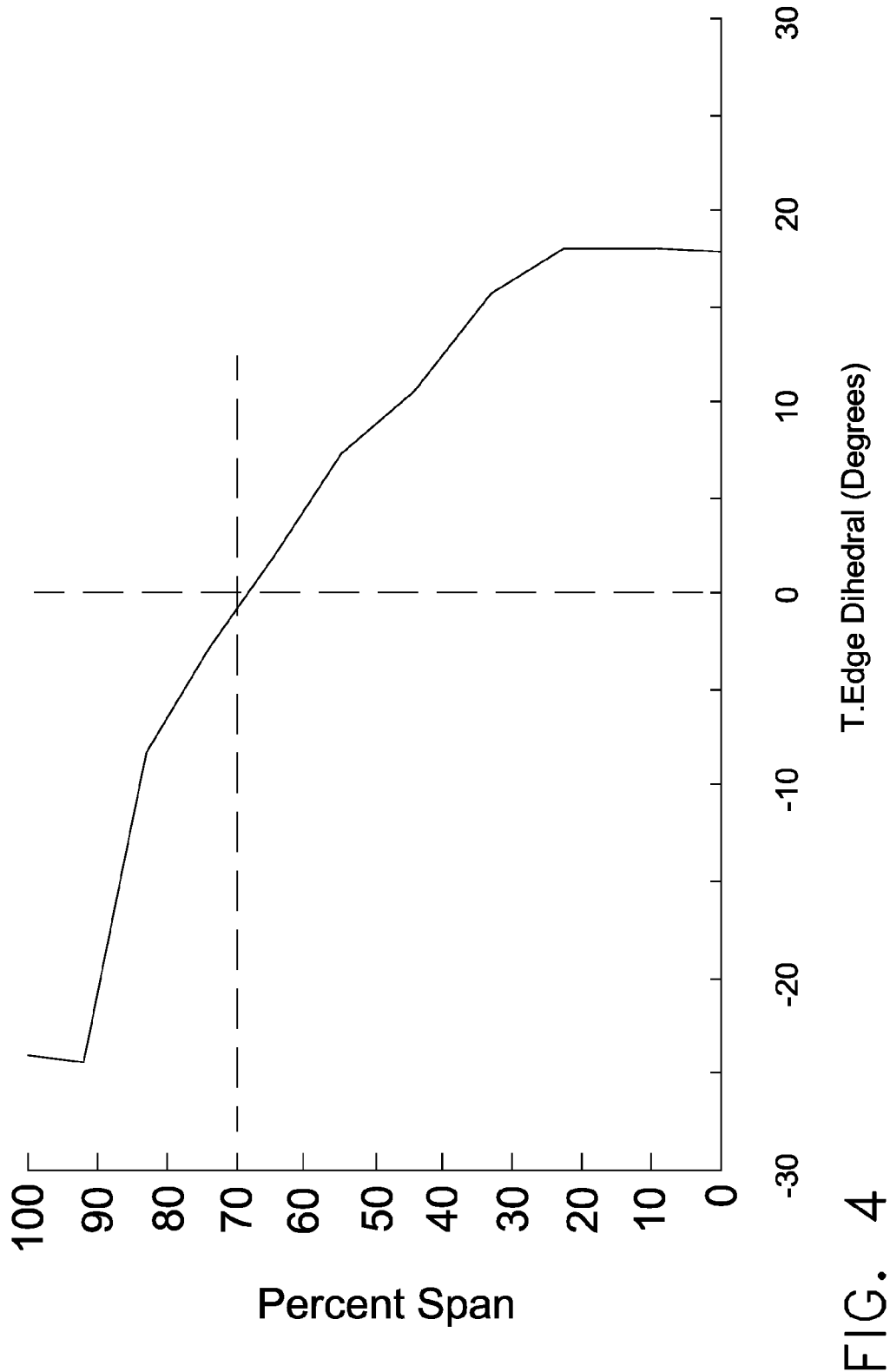
FIG. 4 is a graph plotting airfoil trailing edge dihedral angle in degrees over the radial span of the airfoil of the blade illustrated in FIG. 3 in an exemplary embodiment.

In another embodiment of the present invention, the airfoil 10 trailing edge 30 has a unique dihedral angle profile, such as, for example, shown in FIG. 4. In this embodiment, shown in FIG. 3, the airfoil 10 has a second inner span region 15 (shown as "S3") between the airfoil root 11 and a second height location 42 on the airfoil trailing edge 30 and a second outer span region 16 (shown as "S4") between the second height location 42 and the airfoil tip 12. In this embodiment, the trailing edge 30 has a dihedral profile (see FIG. 4) such that the trailing edge dihedral angle decreases, in a spanwise direction, in a portion of the second inner span region 15 and decreases in the second outer span region 16. In one embodiment, the airfoil 10 has a trailing edge 30 wherein the trailing edge dihedral angle at the airfoil tip 12 has a negative value. This is shown in FIGS. 2, 3 and 4. It may be noted in FIGS. 2 and 3 that due to the relatively large negative dihedral angle near the trailing edge tip region, that region has a shape that curls significantly towards the pressure side 5 of the airfoil. This directs some of the tip flow away from the tip towards a radially inner direction. In some embodiments of the airfoil 10, the trailing edge 30 in the entire second outer span region 16 may have trailing edge dihedral angles that are negative. In some embodiments, the airfoil 10 trailing edge dihedral angle in the second outer span region decreases at a substantially constant rate of change with respect to the span. See for example, FIG. 4. In a preferred embodiment of the airfoil 10, the second outer span region 16 extends from about 70% of the span to the airfoil tip 12.

Figure 6:
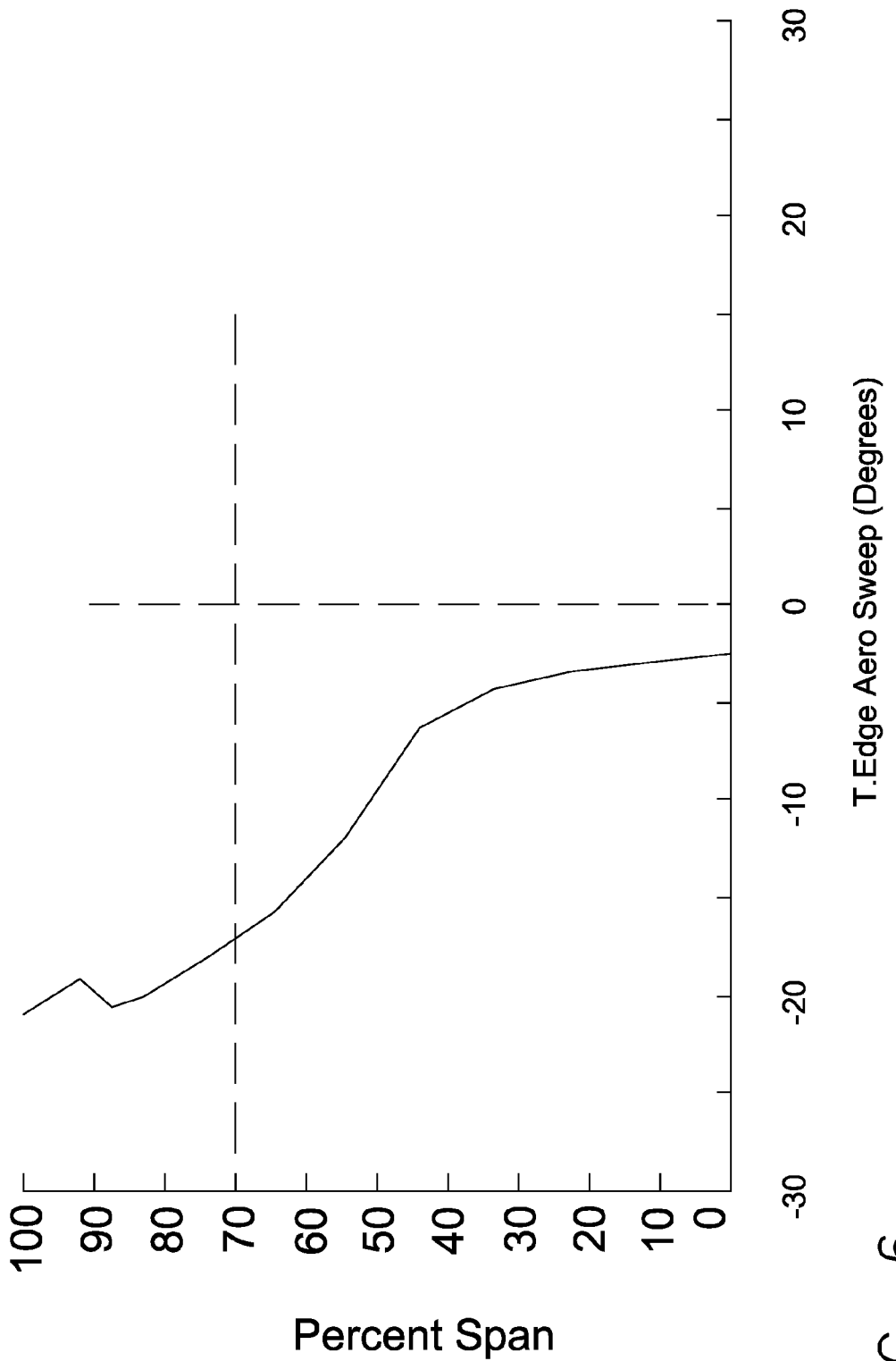
FIG. 6 is a graph plotting airfoil trailing edge sweep angle in degrees over the radial span of the airfoil of the blade illustrated in FIG. 3 in an exemplary embodiment.
Figure 7:
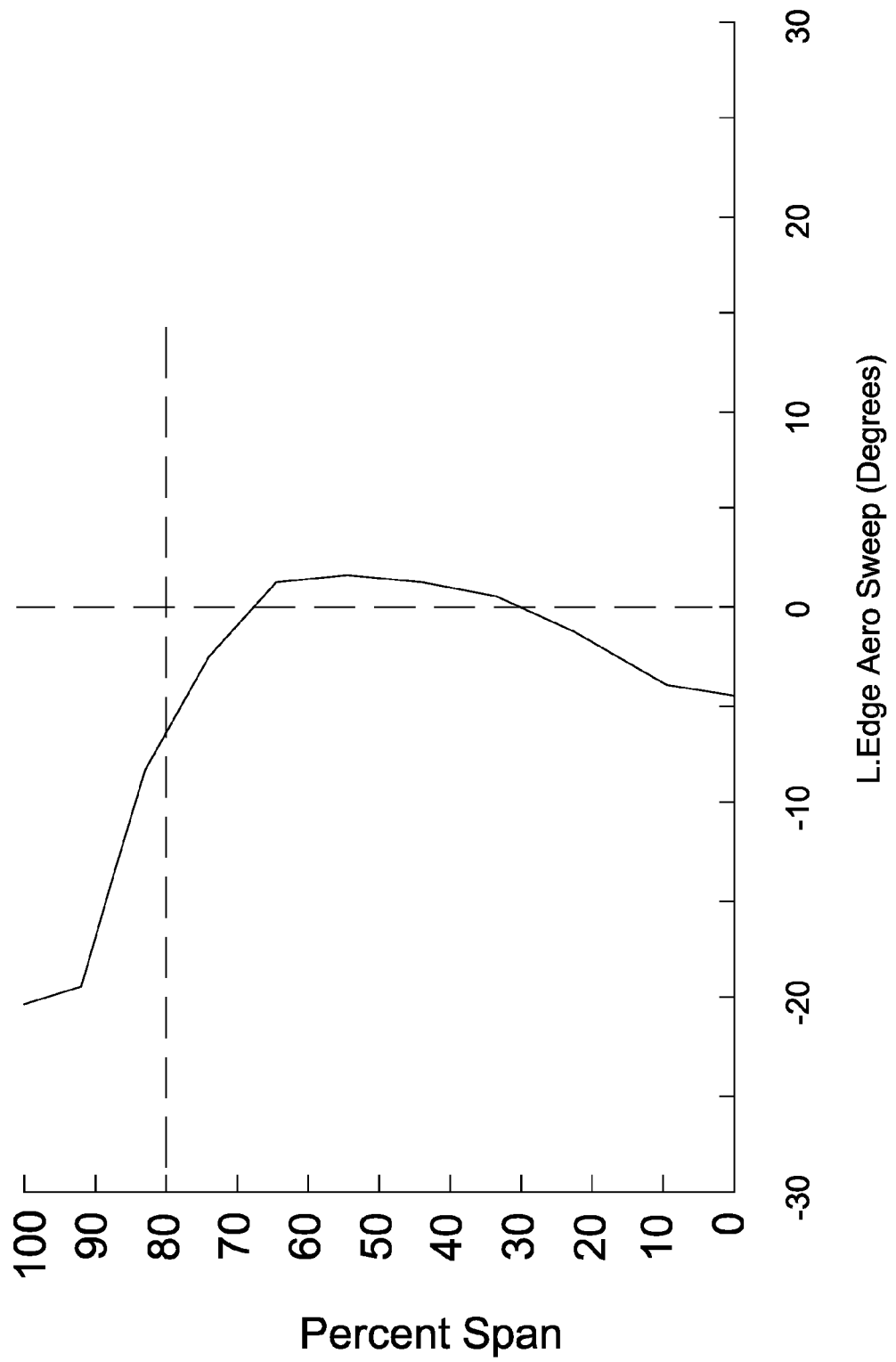
FIG. 7 is a graph plotting airfoil leading edge sweep angle in degrees over the radial span of the airfoil of the blade illustrated in FIG. 3 in an exemplary embodiment.

In other embodiments of the present invention, the airfoil 10 trailing edge 30 may have a forward sweep in the second outer span region, such as, for example, shown in FIG. 6. The forward sweep of the trailing edge 30 shown in FIG. 6, combined with the dihedral angle profile shown in FIG. 4 provides enhanced flow characteristics at the tip and facilitates improved stall margin. In other embodiments of the present invention, both the leading edge 20 and the trailing edge 30 may have the dihedral characteristics described above (See FIGS. 4 and 5). Further, both the leading edge 20 and the trailing edge 30 may have the sweep characteristics, such as shown in FIGS. 6 and 7.

In another aspect of the invention, FIG. 8 shows a compressor 100 for a gas turbine engine. The compressor 100 has a rotor stage 102 having rotor blades 104 spaced circumferentially around a rotor hub 106 with a longitudinal centerline axis 101. Each rotor blade has an airfoil 10, such as described previously herein, wherein the trailing edge 30 has a dihedral profile such that the trailing edge dihedral angle decreases in at least a portion of the second inner span region 15 and the second outer span region 16. In a preferred embodiment, the trailing edge dihedral angle at the airfoil tip 12 has a negative value. In another embodiment, the compressor 100 has airfoils wherein the trailing edge 30 has a forward sweep in the second outer span region. In another embodiment, the compressor 100 has airfoils that further have a leading edge 20 having a dihedral profile such that the leading edge has increasing dihedral angles in a first inner span region 13 of the leading edge and decreasing dihedral angles in a first outer span region of the leading edge. In other embodiments, the airfoil leading edge 20 has a forward sweep in the first outer span region. FIG. 8 shows a compressor 100 having multiple stages of stators (S1, S2, etc.) and multiple stages of rotors 106 (R1, R2, etc.). The compressor 100 may have rotors stages having blades 104 that may have one or more of the trailing edge and leading edge dihedral and sweep features described previously herein.

Analyses using known methods, such as Viscous 3-D CFD analyses, were used to compare airfoils with the aforementioned features of the embodiments of the present invention to baseline airfoils that lacked those features. The analyses have shown more than 5% improvement in throttle margin with no loss in design point efficiency for embodiments of the present invention described herein. In conventional compressors having conventional blades and airfoils, as the compressor is throttled towards stall, blockage accumulates near the rotor tip on the pressure surface and propagates tangentially across the rotor passage. As the entire passage width becomes blocked, the capacity of a conventional compressor having conventional rotor blade/airfoil to produce a pressure increase is reduced, and stall may result. Comparison of rotor blades/airfoils run at similar conditions, with and without the embodiments of present invention described previously herein, shows that the aforementioned features of the present invention cause the region of blockage to be drawn radially down the pressure surface of the blade. This increases airfoil tolerance to throttling, increasing stall margin for the various embodiments of the present invention described herein.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:
1. An airfoil for a compressor comprising:
an airfoil root, an airfoil tip located at a spanwise distance from the airfoil root, a leading edge extending from the airfoil root to the airfoil tip, to trailing edge extending from the airfoil root to the airfoil tip, airfoil pressure and suction sides extending between the leading edge and the trailing edge;
a first inner span region ("S1") between the airfoil root and a first height location on the airfoil leading edge;

a first outer span region ("S2") between the first height location and the airfoil tip; and wherein the leading edge has a dihedral profile such that the leading edge dihedral angle increases in the first inner span region and decreases in the first outer span region, wherein the leading edge dihedral angle in the first outer span region decreases at a substantially constant rate of change with respect to the span.

2. An airfoil according to claim 1 wherein the leading edge dihedral angle at the airfoil tip is negative.

3. An airfoil according to claim 1 wherein the first outer span region extends from about 80% of the span to the airfoil tip.

4. An airfoil according to claim 1 wherein the leading edge has a forward sweep in the first outer span region.

5. An airfoil for a compressor comprising:

an airfoil root, an airfoil tip located at a spanwise distance from the airfoil root, a leading edge extending from the airfoil root to the airfoil tip, a trailing edge extending from the airfoil root to the airfoil tip, airfoil pressure and suction sides extending between the leading edge and the trailing edge;

a second inner span region ("S3") between the airfoil root and a second height location on the airfoil trailing edge;

a second outer span region ("S4") between the second height location and the airfoil tip; and wherein the trailing edge has a dihedral profile such that the trailing edge dihedral angle decreases in at least a portion of the second inner span region and the second outer span region and wherein the trailing edge dihedral angle at the airfoil tip has a negative value, wherein the trailing edge dihedral angle in the second outer span region decreases at a substantially constant rate of change with respect to the span.

6. An airfoil according to claim 5 wherein the trailing edge dihedral angle at the airfoil tip is less than −10 degrees.

7. An airfoil according to claim 5 wherein the trailing edge in the entire second outer span region has trailing edge dihedral angles that are negative.

8. An airfoil according to claim 5 wherein the trailing edge dihedral angle in the second outer span region decreases at a substantially constant rate of change with respect to the span.

9. An airfoil according to claim 5 wherein the second outer span region extends from about 70% of the span to the airfoil tip.

10. An airfoil according to claim 5 wherein the trailing edge has a forward sweep in the second outer span region.

11. An airfoil according to claim 5 further comprising a leading edge having a dihedral profile such that the leading edge has increasing dihedral angles in a first inner span region of the leading edge and decreasing dihedral angles in a first outer span region of the leading edge.

12. An airfoil according to claim 11, wherein the leading edge has a forward sweep in the first outer span region.

13. An airfoil according to claim 12 wherein the trailing edge has a forward sweep in the second outer span region.

14. A compressor for a gas turbine engine comprising:

a rotor stage having a plurality of rotor blades spaced circumferentially around a rotor hub with a longitudinal centerline axis, each rotor blade comprising an airfoil having an airfoil root, an airfoil tip located at a spanwise distance from the airfoil root, a leading edge extending from the airfoil root to the airfoil tip, a trailing edge extending from the airfoil root to the airfoil tip, airfoil pressure and suction sides extending between the leading edge and the trailing edge;

a first inner span region ("S1") between the airfoil root and a first height location on the airfoil leading edge and a first outer span region ("S2") between the first height location and the airfoil tip;

a second inner span region ("S3") between the airfoil root and a second height location on the airfoil trailing edge and a second outer span region ("S4") between the second height location and the airfoil tip; and wherein the trailing edge has a dihedral profile such that the trailing edge dihedral angle decreases in at least a portion of the second inner span region and the second outer span region and wherein the trailing edge dihedral angle at the airfoil tip has a negative value, wherein the trailing edge dihedral angle in the second outer span region decreases at a substantially constant rate of chance with respect to the span.

15. A compressor according to claim 14 wherein the trailing edge dihedral angle at the airfoil tip is less than −10 degrees.

16. A compressor according to claim 14 wherein the trailing edge has a forward sweep in the second outer span region.

17. A compressor according to claim 14 further comprising a leading edge having a dihedral profile such that the leading edge has increasing dihedral angles in a first inner span region of the leading edge and decreasing dihedral angles in a first outer span region of the leading edge.

18. A compressor according to claim 17 wherein the leading edge has a forward sweep in the first outer span region.

* * * * *

UNITED STATES PATENT AND TRADEMARK OFFICE
CERTIFICATE OF CORRECTION

PATENT NO. : 8,684,698 B2  
APPLICATION NO. : 13/071996  
DATED : April 1, 2014  
INVENTOR(S) : Breeze-Stringfellow et al.

Page 1 of 1

It is certified that error appears in the above-identified patent and that said Letters Patent is hereby corrected as shown below:

In the Claims

In Column 6, Line 62, in Claim 1, delete "to trailing" and insert -- a trailing --, therefor.

In Column 8, Line 34, in Claim 14, delete "chance" and insert -- change --, therefor.

Signed and Sealed this  
Eighth Day of July, 2014

Michelle K. Lee  
*Deputy Director of the United States Patent and Trademark Office*